US008059572B2

(12) United States Patent
Kim et al.

(10) Patent No.: US 8,059,572 B2
(45) Date of Patent: Nov. 15, 2011

(54) METHOD OF TRANSMITTING AND RECEIVING MULTICAST DATA

(75) Inventors: Yang Gi Kim, Seoul (KR); Sun Ju Lim, Daejeon (KR)

(73) Assignee: LG Electronics Inc., Seoul (KR)

( * ) Notice: Subject to any disclaimer, the term of this patent is extended or adjusted under 35 U.S.C. 154(b) by 1123 days.

(21) Appl. No.: 11/779,374

(22) Filed: Jul. 18, 2007

(65) Prior Publication Data
US 2008/0181161 A1 Jul. 31, 2008

(30) Foreign Application Priority Data
Jan. 25, 2007 (KR) ........................ 10-2007-0007970

(51) Int. Cl.
*H04H 20/71* (2008.01)
(52) U.S. Cl. ...................... 370/312; 370/311; 370/310.1; 370/252; 370/332; 370/395.21; 455/515; 455/509; 455/450; 455/518; 455/422.1
(58) Field of Classification Search ............... 455/435.2, 455/412.2, 414.1, 456.1; 370/260, 390, 401, 370/432, 352, 395.2; 709/204, 227, 236; 714/751–752, 760
See application file for complete search history.

(56) References Cited

U.S. PATENT DOCUMENTS

| 6,466,552 B1 * | 10/2002 | Haumont ...................... 370/310 |
| 6,741,575 B1 * | 5/2004 | Zhang et al. ................... 370/329 |
| 6,895,216 B2 * | 5/2005 | Sato et al. ..................... 455/3.06 |
| 7,161,958 B2 * | 1/2007 | Aramaki ........................ 370/470 |
| 7,362,757 B2 * | 4/2008 | Griswold et al. ............. 370/390 |
| 7,363,047 B2 * | 4/2008 | Yi et al. .......................... 455/515 |
| 7,474,887 B2 * | 1/2009 | Chandra et al. ............ 455/343.2 |
| 7,564,786 B2 * | 7/2009 | Lim et al. ....................... 370/230 |
| 7,623,876 B2 * | 11/2009 | Sarikaya et al. .............. 455/458 |
| 2004/0029616 A1 * | 2/2004 | Kim et al. ...................... 455/560 |
| 2004/0253996 A1 * | 12/2004 | Chen et al. ..................... 455/574 |
| 2006/0029078 A1 * | 2/2006 | Lu et al. ..................... 370/395.2 |
| 2006/0050659 A1 * | 3/2006 | Corson et al. ................. 370/310 |
| 2007/0030849 A1 * | 2/2007 | Shin .............................. 370/390 |
| 2007/0217416 A1 * | 9/2007 | Okuda .......................... 370/390 |
| 2008/0062948 A1 * | 3/2008 | Ponnuswamy ............... 370/342 |

FOREIGN PATENT DOCUMENTS
CN 1476260 A 2/2004
CN 1735230 A 2/2006

* cited by examiner

*Primary Examiner* — Nick Corsaro
*Assistant Examiner* — Babar Sarwar
(74) *Attorney, Agent, or Firm* — Birch, Stewart, Kolasch & Birch, LLP

(57) ABSTRACT

The present invention relates to a wireless mobile communication system, and more particularly, to a method of transmitting data to mobile terminals in the wireless mobile communication system capable of transmitting multicast data.
In order to solve the aforementioned problems in the prior art, a method of transmitting data to mobile terminals in a mobile terminal communicating with a network through which multicast data are transmitted. The method of the present invention comprises the steps of transmitting a requesting frame to the network for requesting the multicast data when the start of a multicast service is recognized through an upper layer of the mobile terminal; receiving a response frame from the network in response to the request frame; and receiving the multicast data from the network.

21 Claims, 12 Drawing Sheets

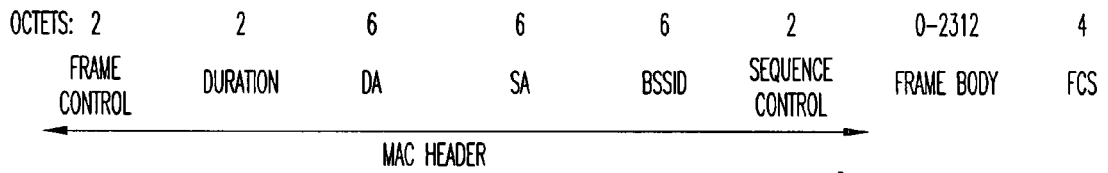

| OCTETS: 2 | 2 | 6 | 6 | 6 | 2 | 0-2312 | 4 |
|---|---|---|---|---|---|---|---|
| FRAME CONTROL | DURATION | DA | SA | BSSID | SEQUENCE CONTROL | FRAME BODY | FCS |

← MAC HEADER →

[BEACON FRAME FORMAT](SUBTYPE: BEACON)

| ORDER | INFORMATION | NOTES |
|---|---|---|
| 1 | TIMESTAMP | |
| 2 | BEACON INTERVAL | |
| 3 | CAPABILITY INFORMATION | |
| 4 | SSID | |
| 5 | SUPPORTED RATES | |
| 6 | FH PARAMETER SET | THE FH PARAMETER SET INFORMATION ELEMENT IS PRESENT WITHIN BEACON FRAMES GENERATED BY STAs USING FREQUENCY-HOPPING PHYs |
| 7 | DS PARAMETER SET | THE DS PARAMETER SET INFORMATION ELEMENT IS PRESENT WITHIN BEACON FRAMES GENERATED BY STAs USING DIRECT SEQUENCE PHYs |
| 8 | CF PARAMETER SET | THE CF PARAMETER SET INFORMATION ELEMENT IS ONLY PRESENT WITHIN BEACON FRAMES GENERATED BY APs SUPPORTING A PCF |
| 9 | IBSS PARAMETER SET | THE IBSS PARAMETER SET INFORMATION ELEMENT IS ONLY PRESENT WITHIN BEACON FRAMES GENERATED BY STAs IN AN IBSS |
| 10 | TIM | THE TIM INFORMATION ELEMENT IS ONLY PRESENT WITHIN BEACON FRAMES GENERATED BY APs |

[PROBE REQUEST FRAME FORMAT] (SUBTYPE: PROBE REQUEST)

| ORDER | INFORMATION |
|---|---|
| 1 | SSID |
| 2 | SUPPORTED RATES |

[PROBE RESPONSE FRAME FORMAT](SUBTYPE: PROBE RESPONSE)

| ORDER | INFORMATION | NOTES |
|---|---|---|
| 1 | TIMESTAMP | |
| 2 | BEACON INTERVAL | |
| 3 | CAPABILITY INFORMATION | |
| 4 | SSID | |
| 5 | SUPPORTED RATES | |
| 6 | FH PARAMETER SET | THE FH PARAMETER SET INFORMATION ELEMENT IS PRESENT WITHIN PROBE RESPONSE FRAMES GENERATED BT STAs USING FREQUENCY-HOPPING PHYs |
| 7 | DS PARAMETER SET | THE DS PARAMETER SET INFORMATION ELEMENT IS PRESENT WITHIN PROBE RESPONSE FRAMES GENERATED BY STAs USING DIRECT SEQUENCE PHYs |
| 8 | CF PARAMETER SET | THE CF PARAMETER SET INFORMATION ELEMENT IS ONLY PRESENT WITHIN BEACON FRAMES GENERATED BY APs SUPPORTING A PCF |
| 9 | IBSS PARAMETER SET | THE IBSS PARAMETER SET INFORMATION ELEMENT IS ONLY PRESENT WITHIN PROBE FRAMES GENERATED BY STAs IN AN IBSS |

FIG.2

[MANAGEMENT FRAME BODY COMPONENTS]
WITHIN MANAGEMENT FRAMES, FIXED-LENGTH MANDATORY FRAME BODY COMPONENTS ARE DEFINED AS FIXED FIELDS: VARIABLE LENGTH MANDATORY AND ALL OPTIONAL FRAME BODY COMPONENTS ARE DEFINED AS INFORMATION ELEMENTS

[FIXED FIELDS]
[CAPABILITY INFORMATION FIELD]

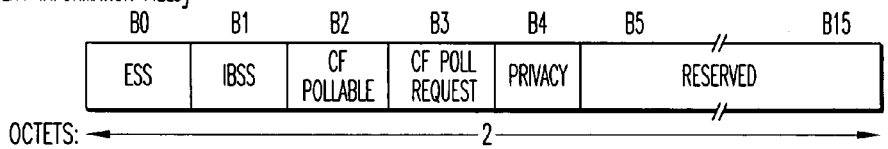

[INFORMATION ELEMENTS]

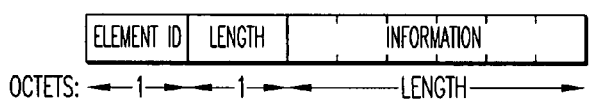

TABLE 20 - ELEMENT IDs

| INFORMATION ELEMENT | ELEMENT ID |
|---|---|
| SSID | 0 |
| SUPPORTED RATES | 1 |
| FH PARAMETER SET | 2 |
| DS PARAMETER SET | 3 |
| CF PARAMETER SET | 4 |
| TIM | 5 |
| IBSS PARAMETER SET | 6 |
| RESERVED | 7-15 |
| CHALLENGE TEXT | 16 |
| RESERVED FOR CHALLENGE TEXT EXTENSION | 17-31 |
| RESERVED | 32-255 |

[SERVICE SET IDENTITY (SSID) ELEMENT]
THE SSID ELEMENT INDICATES THE IDENTITY OF AN ESS OR IBSS

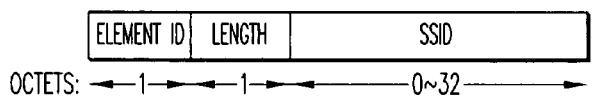

FIG.3

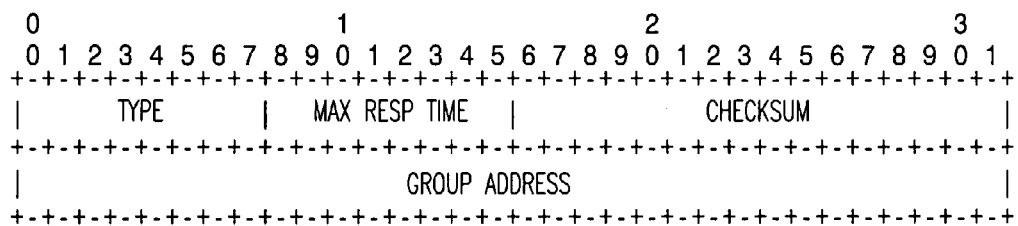

FIG.4

| CATEGORY | ACTION | MULTICAST MAC ADDRESS |
|---|---|---|

OCTETS: ←——1——→←——1——→←——————6——————→

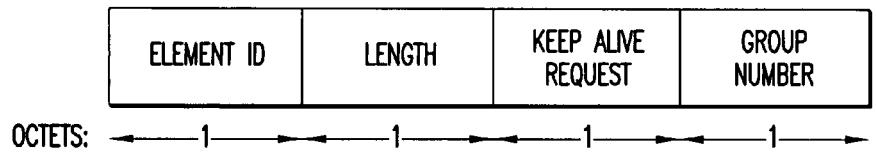
FIG.13
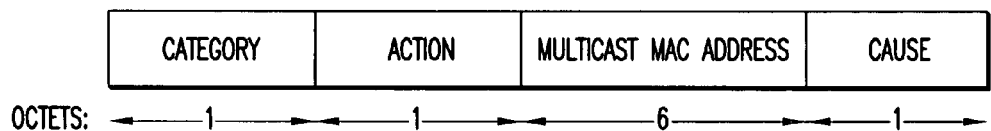
FIG.14
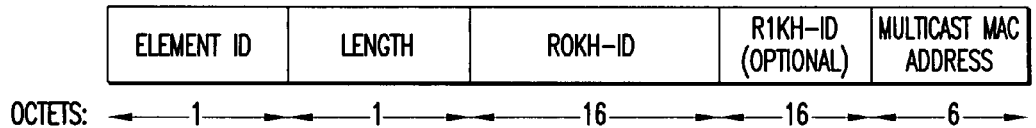
FIG.15
| ORDER | INFORMATION |
|-------|-------------|
| X | MULTICAST MAC ADDRESS (INCLUDING SERVICE INFORMATION OF STA) |
− ASSOCIATION REQUEST FRAME BODY −
FIG.16

— ADD-NOTIFY DATA FIELD FORMAT —

— MOVE-NOTIFY DATA FIELD FORMAT —

METHOD OF TRANSMITTING AND RECEIVING MULTICAST DATA

BACKGROUND OF THE INVENTION

1. Field of the Invention

The present invention relates to a wireless mobile communication system, and more particularly, to a method of transmitting data to mobile terminals in the wireless mobile communication system capable of transmitting multicast data.

2. Description of the Related Art

The present invention is directed to a communication method applicable to a mobile communication system capable of transmitting multicast data. Hereinafter, a communication system using a wireless local area network (LAN) interface will be described as an example of the mobile communication system capable of transmitting multicast data.

FIG. 1 is a view showing the structure of a frame used in a wireless LAN (IEEE 802.11).

FIG. 2 is a view showing an example of a management frame used in a wireless LAN. As shown in the figure, an example of the management frame can be a beacon, a probe request, and a probe response.

FIG. 3 is a view showing management frame body components used in the IEEE 802.11. As shown in the figure, the management frame body comprises a fixed field area and an information element area.

FIG. 4 is a view showing the structure of the Internet group management protocol (IGMP) (version 2) necessary for a multicast service. The IGMP is an Internet protocol that provides a means for allowing an Internet computer to inform neighboring routers of a multicast group. The multicast service is performed in an upper layer (e.g., an IP layer), and a wireless LAN interface relays the multicast service.

Hereinafter, a general configuration of a wireless LAN (IEEE 802.11) system will be described.

The wireless LAN is a network environment for providing LAN services to wireless terminals equipped with wireless LAN cards, such as a personal data assistant (PDA) or a notebook personal computer (PC), through an access point (AP) corresponding to a hub of a wired LAN. In other words, it can be considered as a system in which a wireless section between the AP and a network interface card (NIC) such as a wireless LAN card is substituted for a wired section between a hub and a user terminal in an existing Ethernet system. The wireless LAN has advantages in that a wireless terminal can be easily relocated and a network can be easily constructed and expanded since no wiring is required. It is also possible to communicate while moving. However, there are disadvantages in that the transmission speed is relatively low compared with a wired LAN, and signal quality is unstable and signal interference can occur due to characteristics of a wireless channel.

FIG. 5 is a view showing the configuration of a network based on a wireless LAN interface. As shown in the figure, wireless LAN networks are classified into two types according to whether a network includes an AP. A network which includes an AP is called an infrastructure network, and a network which does not include an AP is called an ad-hoc network. A service area provided by a single AP is called a basic service area (BSA), and an AP and wireless terminals connected thereto are called a basic service set (BSS). A service which a wireless terminal connected to the AP receives in such a manner is called a station service (SS). The SS also includes services exchanged between wireless terminals in the ad-hoc network. As shown in FIG. 5, the BSAs may overlap one another. Two or more APs can be interconnected with one another so that a wireless terminal connected to one AP can communicate with other wireless terminals connected to the other APs. In this case, the connection between the APs is called a distribution system (DS), and a service provided through the DS is called a distribution system service (DSS). In addition, an area where the DSS can be provided is called an extended service area (ESA), and all wireless terminals and APs that receive the DSS within the ESA are called an extended service set (ESS).

There are nine service items defined in the IEEE 802.11 standard as shown in Table 1.

TABLE 1

| |
|---|
| a) Authentication |
| b) Association |
| c) Deauthentication |
| d) Deassociation |
| e) Distribution |
| f) Integration |
| g) Privacy |
| h) Reassociation |
| i) MSDU delivery |

Authentication and deauthentication are related to the user authentication; and association, deassociation, and reassociation are related to the connection of a wireless terminal to an AP. Reassociation is used when a wireless terminal changes the BSS within the ESS or when a current connection state is changed. A distribution service is a conceptual service by which a wireless terminal connected to an AP through the DS can communicate with a wireless terminal connected to another AP. Integration is used for connecting an IEEE 802.11 LAN to an external general LAN that may be a wired or wireless LAN.

These items can be modified through DS settings. Privacy is related to security and uses the wired equivalent privacy (WEP) protocol. MAC service data unit (MSDU) delivery is used to transmit user data. These service items are grouped and divided into two service categories described above, which are shown in Table 2.

TABLE 2

| SS (Station Service) | DSS (Distribution System Service) |
|---|---|
| a) Authentication | a) Association |
| b) Deauthentication | b) Deassociation |
| c) Privacy | c) Distribution |
| d) MSDU delivery | d) Integration |
| | e) Reassociation |

A wireless LAN AP performs a variety of functions similar to functions of a hub of a wired LAN, including a bridge function, home gateway function, automatic fallback function, roaming function and the like. The bridge function enables communications between two buildings spaced apart from each other using a directional high-gain external antenna. The home gateway function allows home information communication equipment to be connected to an external network through the wireless LAN AP. The automatic fallback function is a function of lowering the transmission speed of the AP from 11 Mbps to 5.5 Mbps, 2 Mbps or 1 Mbps when a distance between the AP and a wireless terminal is increased and thus the channel state becomes worse. If a high speed transmission of 11 Mbps is maintained even though the channel state is not good, losses due to retransmission or the like are greatly increased, and thus, the transmission speed is properly lowered. The basic roaming function is permitted between the BSSs.

Hereinafter, the operation of receiving a multicast service in a conventional wireless network is described. When a mobile terminal (STA: station) receives a multicast service from a network through a wireless network based on a wireless LAN interface, a procedure shown in FIG. 6 will be performed.

As shown in FIG. 6, a multicast router informs all the connected APs of information on the multicast service through an IGMP query (S601). The AP transmits the IGMP query through a broadcast message again, and thus, the mobile terminals can receive the relevant message (S602). If each of the mobile terminals wishes to receive the multicast service, it joins the relevant multicast service by transmitting an IGMP report (S603). As shown in the figure, the IGMP report is transferred to the AP which in turn transfers the IGMP report to the multicast router.

The multicast router transmits multicast data to the locations where relevant terminals are placed (S604). That is, the AP transmits the multicast data received from the multicast router to each terminal, so that the multicast service can be performed (S605).

The multicast data may be transmitted at specific intervals. If there are no multicast data to receive according to the multicast service interval, a mobile terminal can enter a power saving (PS) mode (S606).

All the mobile terminals should be ready to receive the IGMP query that is periodically transmitted by the multicast router. To this end, all the terminals should wake up at a specific time point (S607). The multicast router transmits an IGMP query to all the connected APs at a specific interval, e.g. every query interval (S608). The AP transmits the IGMP query to the terminals in the same manner as step S602 (S609). The IGMP report is periodically transmitted if a terminal desires to continue receiving the relevant multicast service (S610). In FIG. 6, a first terminal STA#1, a third terminal STA#3, and a fourth terminal STA#4 can know that a second terminal STA#2 transmits an IGMP report to the AP. Accordingly, the first, third and fourth terminals STA#1, STA#3, and STA#4 do not transmits an IGMP report (S611 and S612). All the terminals can enter the PS mode again according to the multicast service interval (S613).

At the end of each multicast service interval, the relevant terminals should wake up to receive the multicast service again (S614).

The multicast router transmits multicast data to the AP where the relevant terminals are connected (S615). The AP transmits the multicast data received from the multicast router to each terminal, so that the multicast service can be performed (S616).

Hereinafter, a case where a mobile terminal which has received a multicast service from a specific first AP moves into a second AP will be explained.

FIG. 7 is a flowchart illustrating the operation that is performed when a mobile terminal moves from a specific network into another network while receiving a multicast service.

In FIG. 7, the multicast router informs all the connected APs AP1 and AP2 of information on the multicast service for the terminals using an IGMP query (S701). The APs AP1 and the AP2 transmit the IGMP query through a broadcast message, and the mobile terminals can receive the relevant message (S702). If each of the mobile terminals wishes to receive the multicast service, it joins the relevant multicast service by transmitting an IGMP report (S703, S704 and S705).

The multicast router receives the IGMP reports and transmits multicast data to the locations where the relevant terminals are placed (S706). The APs AP1 and the AP2 transmit the multicast data received from the multicast router to the respective terminals, so that the multicast service can be provided (S707).

Until step S707, the first terminal STA#1 is connected to the AP AP1 and the second and third terminals STA#2 and STA#3 are connected to the AP AP2. Hereinafter, a case where the first terminal moves into an area of the AP AP2 is described. The first terminal STA#1 belonging to the AP1 moves into the area of the AP AP2 (S708).

New multicast data are transmitted to all the APs (S709). The APs AP1 and the AP2 transmit the received multicast data to the respective terminals. That is, although there is no mobile terminal belonging to the AP AP1, the AP AP1 allocates wireless resources and transmits the multicast data (S710). The AP AP2 transmits the multicast data to relevant terminals within the network (S711).

Hereinafter, problems of the prior art will be explained.

When an IGMP query is transmitted to each of terminals according to the prior art, all of mobile terminals that wish to receive the multicast service should be ready to receive the IGMP query. That is, all the mobile terminals should be kept at a state where data can be received. However, a series of procedures for maintaining an activation state to receive the IGMP report query are performed regardless of a series of procedures for saving power of a terminal.

Due to the characteristics of the prior art, there is a certain limitation in maximizing the effect of saving electric power.

Further, due to the above characteristics, in the worst case, there may be an occasion where all the terminals enter the PS mode and no terminal transmits an IGMP report. That is, there may be a problem in that all the terminals cannot receive the multicast service.

When multicast data are transmitted according to the prior art and a terminal that wishes to receive a multicast service moves into an area of a new AP, information about the movement of the terminal is not transferred to the previous AP, and thus, the previous AP should continue distributing the multicast data over the network. Due to the above characteristics, there is another problem in that wireless resources cannot be efficiently used.

In addition, when multicast data are transmitted according to the prior art, a method of transmitting the data is fixed to a point-to-point bearer mode or a point-to-multipoint bearer mode. Therefore, there is a further problem in that an AP cannot receive a sufficient amount of feedback information while freely transmitting data without regard to the number of terminals.

SUMMARY OF THE INVENTION

The present invention is conceived to solve the aforementioned problems in the prior art. Accordingly, an object of the present invention is to provide a method of managing a wireless network multicast group wherein wireless resources can be efficiently managed in a network capable of providing multicast services.

Another object of the present invention is to provide a method of managing a multicast group, by which an effect of saving power consumption can be maximized.

A further object of the present invention is to provide a method of managing a multicast group, by which wireless resources can be efficiently managed in consideration of handovers performed by a terminal.

A still further object of the present invention is to provide a method of managing a multicast group, in which a multicast data transmitting and receiving mode is changed according to the number of terminals that wish to receive a service on a network.

According to an aspect of the present invention for achieving the objects, there is provided a method of transmitting and receiving multicast data in a network in which a multicast service is provided from a specific network entity and then transmitted to at least one mobile terminal. The method of the present invention comprises the steps of: receiving a query message containing information on the multicast service from the network entity; if a request frame for requesting multicast data is received from the at least one mobile terminal, transmitting to the network entity a report message for allowing the mobile terminal to join the multicast service; receiving multicast data corresponding to the multicast service from the network entity and transmitting the received multicast data to the at least one terminal; checking the number of mobile terminals, which have joined the multicast service, based on a group table provided on the network to manage the mobile terminals; and changing a multicast data transmitting and receiving mode according to the number of terminals which have joined the multicast service.

At this time, the step of changing a multicast data transmitting and receiving mode may comprise the steps of comparing the number of joined terminals with a threshold value; if it is determined that the number of joined terminals is smaller than the threshold value, setting the multicast data transmitting and receiving mode to a wireless communication method using a point-to-point wireless bearer; and if it is determined that the number of joined terminals is greater than or equal to the threshold value, setting the multicast data transmitting and receiving mode to a wireless communication method using a point-to-multipoint wireless bearer.

Further, the threshold value may be determined in accordance with the maximum number of channels that can be allocated in a point-to-point manner for each mobile terminal in the network.

Preferably, if the multicast data transmitting and receiving mode is set to the wireless communication method using a point-to-point wireless bearer, the network receives feedback information from the mobile terminal.

At this time, the feedback information may include at least one or more of channel load, AP channel report, neighbor report, received channel power indicator (RCPI), and received signal to noise indicator (RSNI).

Further, the feedback information may be real-time transport control protocol (RTCP).

Meanwhile, the group table may include at least one or more of information on the mobile terminal that requests the multicast service, a multicast MAC address for identifying the multicast service requested by the mobile terminal, information on a group number for identifying at least one mobile terminal, and information on expiration time for allowing information on the mobile terminal to be deleted from the group table when the mobile terminal does not respond to the network.

The method of the present invention may further comprise the steps of transmitting to the mobile terminal a request message for confirming whether the mobile terminal exists in the network.

At this time, the request message may be transmitted through any one of a separate action frame, beacon, and multicast data.

According to another aspect of the present invention, there is provided a method of transmitting and receiving multicast data in a network in which a multicast service is provided from a specific network entity and then transmitted to at least one mobile terminal, the method comprising the steps of transmitting to the mobile terminal a request message for confirming whether the mobile terminal exists in the network; receiving a response message corresponding to the request message from the mobile terminal; updating a group table provided in the network to manage the mobile terminal according to contents of the response message; and changing a multicast data transmitting and receiving mode according to the mobile terminal registered in the group table.

At this time, the response message may be any one of a service sustain message for maintaining a joined state to continue receiving the multicast service and a service end message for terminating the joined state to stop receiving the service.

Preferably, the response message contains category, action, multicast MAC address and cause parameters. More preferably, if the response message is the service sustain message or service end message, the cause parameter is set to a code corresponding to the service sustain message or service end message.

The query message and the report message may be repeatedly transmitted and received at a predetermined time interval, and information on the mobile terminal, which has joined the multicast service, stored in the group table may be updated every time interval.

Further, the multicast data transmitting and receiving mode may be changed at the predetermined time interval.

According to a further aspect of the present invention, there is provided a method of transmitting and receiving multicast data in a network in which a multicast service is provided from a specific network entity and then transmitted to at least one mobile terminal, the method comprising the steps of receiving from the mobile terminal, a transition message provided when the mobile terminal moves between networks; and updating a group table provided in the network to manage the mobile terminal according to contents of the transition message.

At this time, the transition message may include a multicast MAC address for identifying the multicast service provided to the moving mobile terminal.

According to a still further aspect of the present invention, there is provided a method of transmitting and receiving multicast data in a network in which a multicast service is provided from a specific network entity and then transmitted to at least one mobile terminal, the method comprising the steps of receiving from the mobile terminal an association request message transmitted to the network by the mobile terminal; and updating a group table provided in the network to manage the mobile terminal according to contents of the association request message.

At this time, the association request message may contain a multicast MAC address element including information on a service currently used by the mobile terminal.

The method of the present invention may further comprise the step of informing a previous network that the mobile terminal has joined a new network.

At this time, the informing step may be performed through a transfer mode using an ADD-notify packet or a MOVE-notify packet.

Here, the ADD-notify packet or the MOVE-notify packet may contain a multicast MAC address element.

According to a still further aspect of the present invention, there is provided a method of transmitting and receiving multicast data in a mobile terminal that receives a multicast service from a specific network entity through an AP, the method comprising the steps of transmitting a service activation request frame to the AP to receive the multicast service;

receiving a service activation response frame from the AP; and receiving data from the AP according to a multicast data transmitting and receiving mode set by the AP, wherein the multicast data transmitting and receiving mode is determined according to the number of mobile terminals registered in a group table of the AP through the service activation request frame.

At this time, the service activation request frame may contain a multicast MAC address for identifying the multicast service requested by the mobile terminal and information on expiration time for allowing information on the mobile terminal to be deleted from the group table when the mobile terminal does not respond to a network.

Further, the multicast data transmitting and receiving mode may be set either to a wireless communication method using a point-to-multipoint wireless bearer when the number of mobile terminals registered in the group table is greater than or equal to a threshold value or to a wireless communication method using a point-to-point wireless bearer when the number of mobile terminals registered in the group table is smaller than the threshold value.

At this time, the mobile terminal may transmit feedback information containing any one or more of channel load, AP channel report, neighboring report, received channel power indicator (RCPI), and received signal to noise indicator (RSNI) to the AP, when the multicast data transmitting and receiving mode is set to a wireless communication method using a point-to-point wireless bearer.

The method of the present invention may farther comprise the steps of receiving from the AP a request message for confirming whether the mobile terminal exists in the network; and transmitting a response message in response to the request message.

According to a still further aspect of the present invention, there is provided a method of transmitting and receiving multicast data in a mobile terminal that receives a multicast service from a specific network entity through an AP, the method comprising the steps of receiving from the AP a request message for confirming whether the mobile terminal exists in a network; and transmitting a response message for updating a group table provided in the network, in response to the request message.

Preferably, the response message contains category, action, multicast MAC address and cause parameters. More preferably, the mobile terminal assigns a service sustain code to the cause parameter when the response message is a service sustain message, and assigns a service end code to the cause parameter when the response message is a service end message, and then transmits the response message to the AP.

According to a still further aspect of the present invention, there is provided a method of transmitting and receiving multicast data in a mobile terminal that receives a multicast service from a specific network entity through an AP, the method comprising the step of transmitting a transition message for updating a group table provided in a network to manage the mobile terminal when the mobile terminal moves between networks, wherein the transition message contains a multicast MAC address for identifying the multicast service provided to the moving mobile terminal.

According to a still further aspect of the present invention, there is provided a method of transmitting and receiving multicast data in a mobile terminal that receives a multicast service from a specific network entity through an AP, the method comprising the step of transmitting an association request message to receive the multicast service when the mobile terminal moves between networks, wherein a group table provided in the network is updated to manage the mobile terminal according to the association request message.

At this time, the association request message may contain a multicast MAC address element including information on a service currently used by the mobile terminal.

BRIEF DESCRIPTION OF THE DRAWINGS

FIG. 2 is a view showing an example of a management frame used in a wireless LAN.

FIG. 3 is a view showing management frame body components used in the IEEE 802.11.

FIG. 4 is a view showing the structure of the IGMP (version 2) necessary for a multicast service.

FIG. 13 is a view showing an example of a keep-alive request capability information element (IE).

FIG. 14 is a view showing an example of a keep-alive response message according to an embodiment of the present invention.

FIG. 15 is a view showing a fast BSS transition information element additionally including an information element according to an embodiment of the present invention.

FIG. 16 is a view showing an example of an association request frame body according to an embodiment of the present invention.

DETAILED DESCRIPTION OF THE INVENTION

Specific features, operations and effects of the present invention will be further implemented by an embodiment of the present invention. Hereinafter, a preferred embodiment of the present invention will be described in detail with reference to the accompanying drawings.

Specific action frames are proposed to support the functions added in the present embodiment. Hereinafter, an example of category values and action fields for multicast IGMP action frames according to the present embodiment is described. Tables 3 and 4 show an example of category values and an example of action fields, respectively, according to the present embodiment.

TABLE 3

| Category values | | |
|---|---|---|
| Name | Value | See-sub field |
| Wireless Network Management | 6 | IEEE 802.11 v7.4.6 |
| Multicast IGMP Action | 7 | |
| Reserved | 8-127 | |

TABLE 4

| Multicast IGMP action field values | |
|---|---|
| Action field value | Description |
| 0 | Service Activation Request |
| 1 | Service Activation Response |
| 2 | Keep-Alive Request |
| 3 | Keep-Alive Response |
| 4-255 | Reserved |

Hereinafter, an example of the multicast IGMP action frames according to the embodiment of the present invention is explained.

Figure 1:
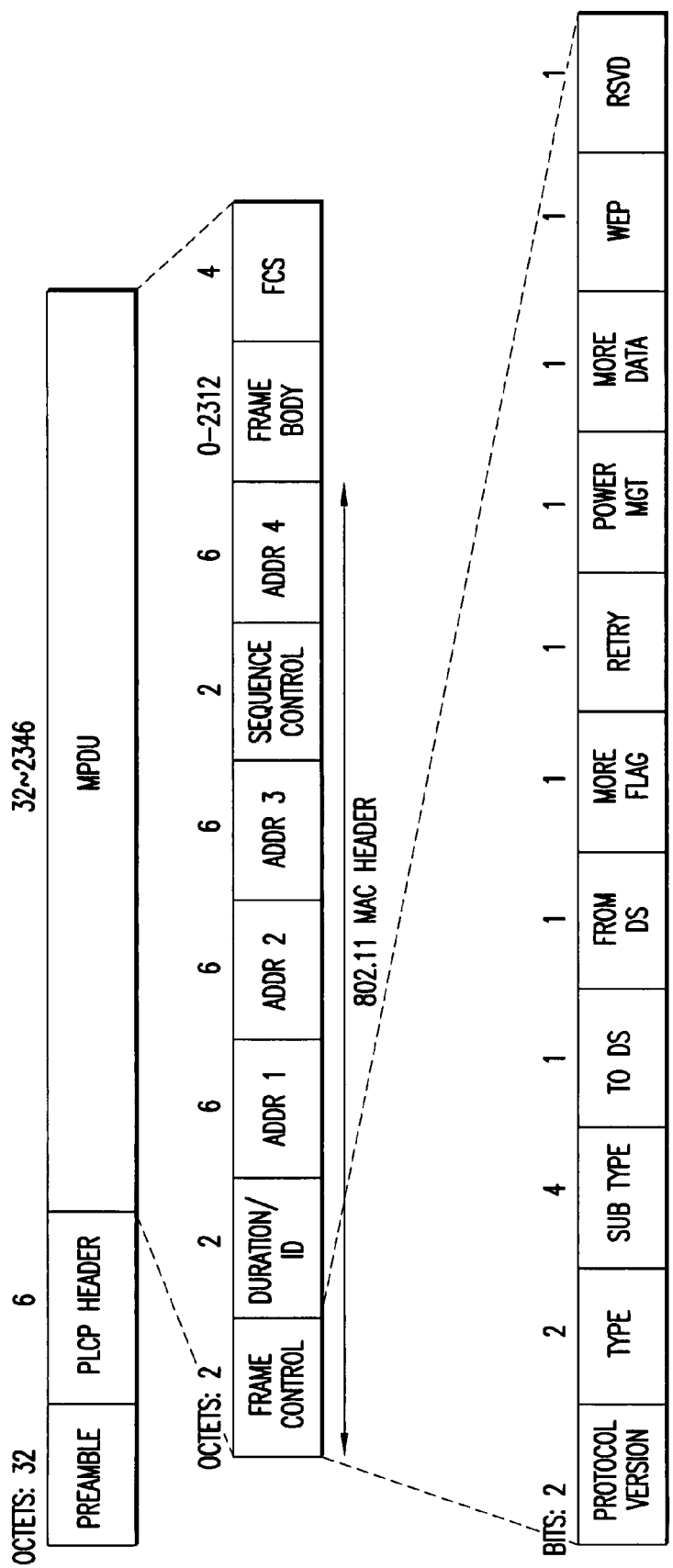
FIG. 1 is a view showing the structure of a frame used in a wireless LAN (IEEE 802.11).
Figure 5:
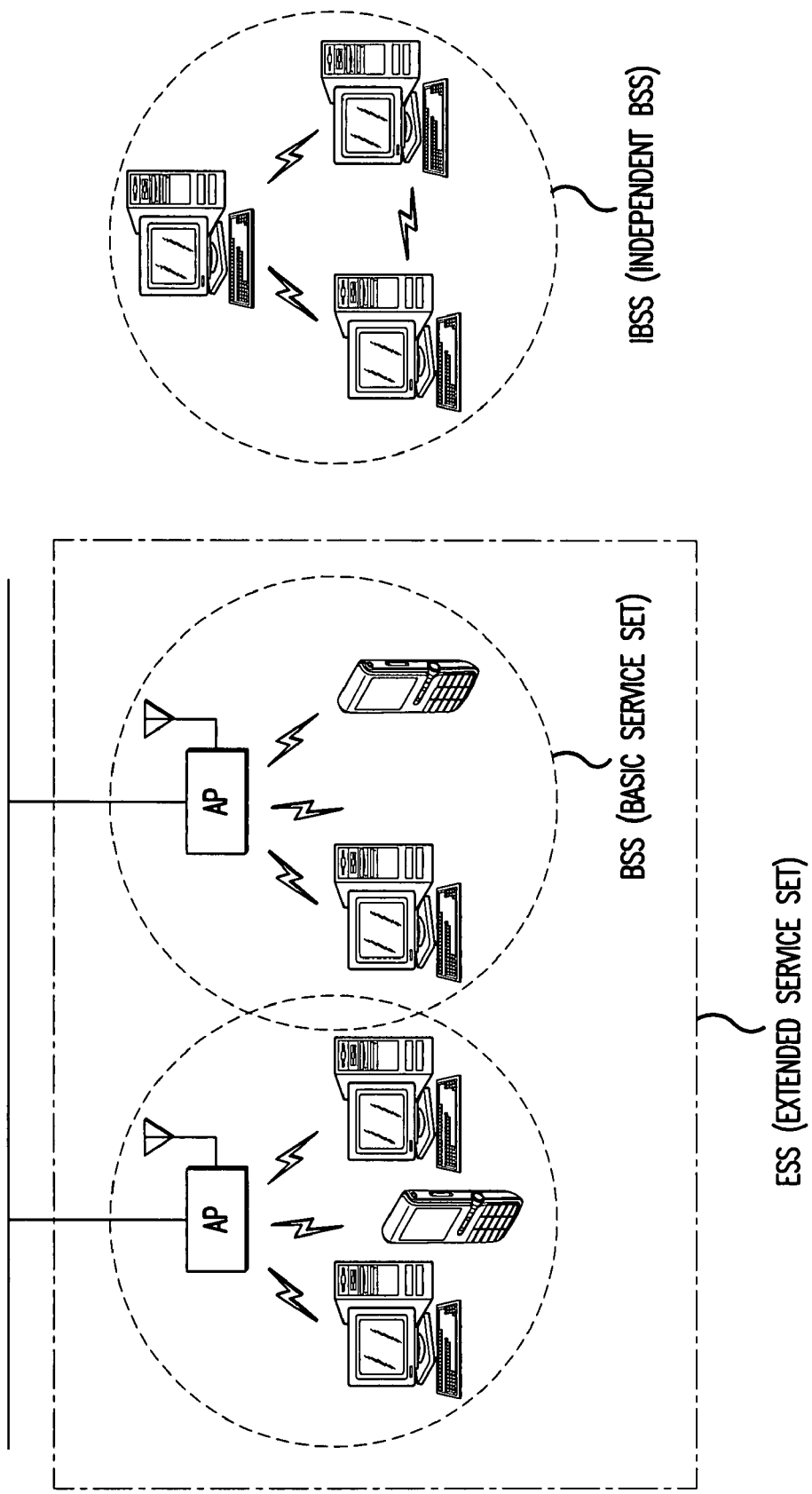
FIG. 5 is a view showing the configuration of a network based on a wireless LAN interface.
Figure 6:
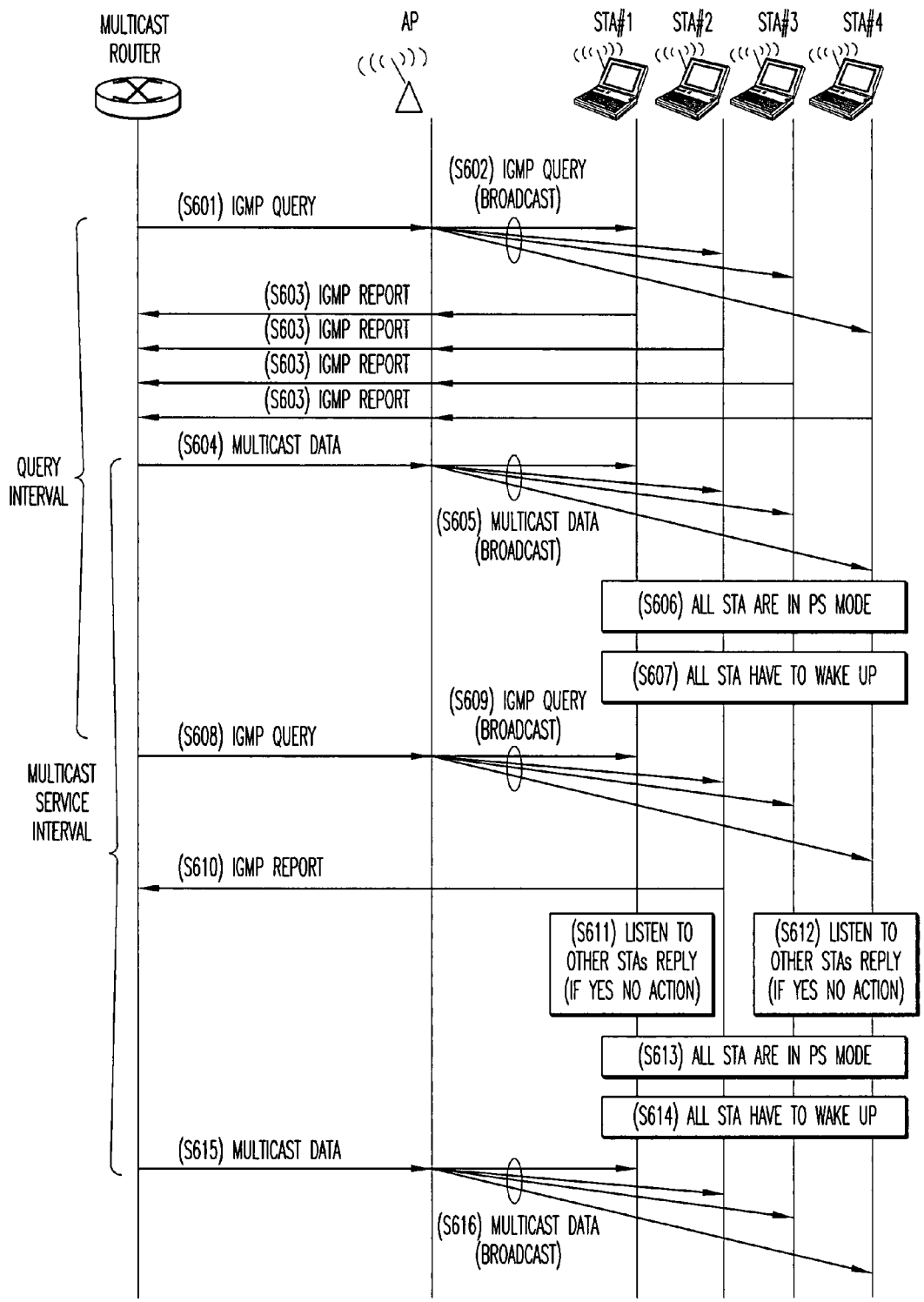
FIG. 6 is a flowchart illustrating a method of receiving a multicast service according to a prior art.
Figures 7, 8:
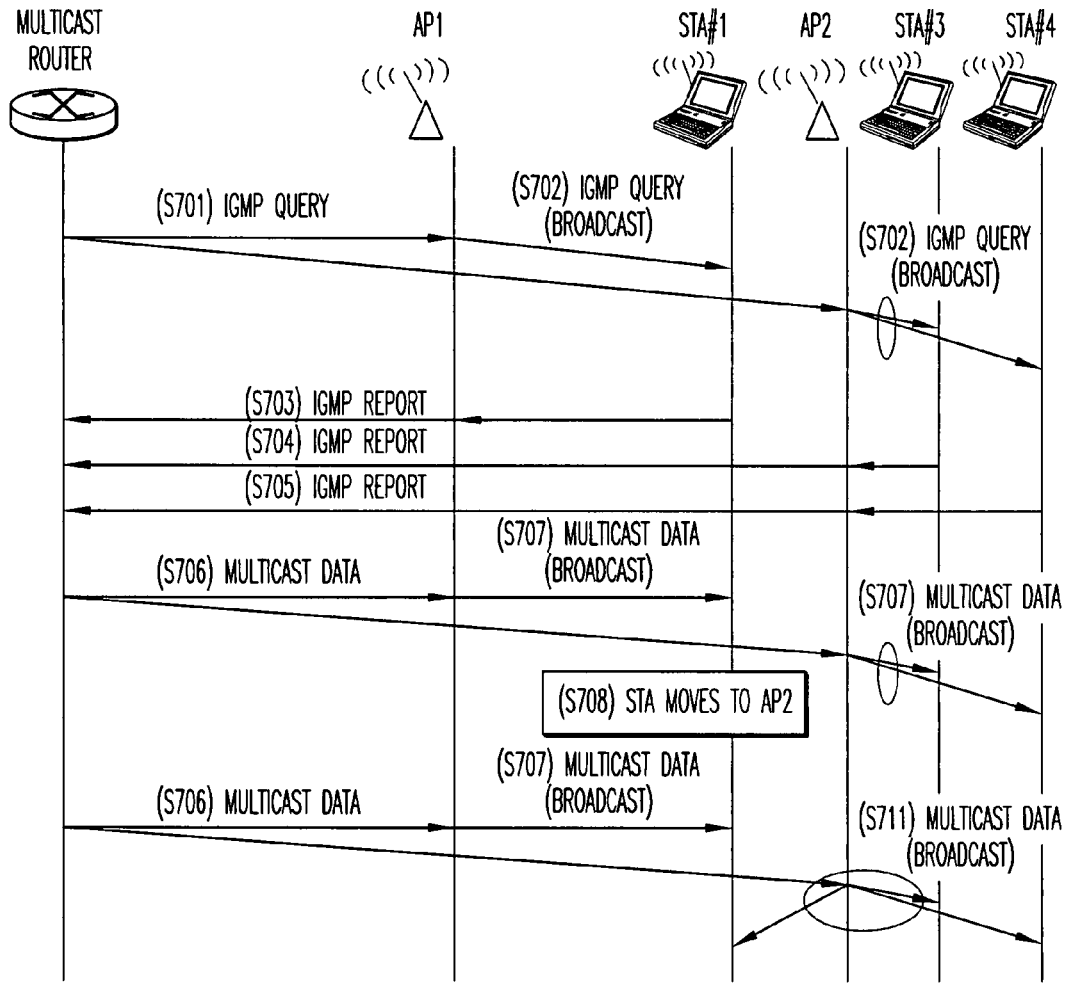
FIG. 7 is a flowchart illustrating the operation that is performed when a mobile terminal moves from a specific network to another network while receiving a multicast service.
FIG. 8 is a view showing an example of a service activation request action frame according to an embodiment of the present invention.

FIG. 8 is a view showing an example of a service activation request action frame according to the present embodiment.

Parameters contained in the action frame of FIG. 8 are described as follows.

Category: a category value for a multicast IGMP action request action frame, which is set to '7' (multicast IGMP action).

Action: set to '0' for a multicast IGMP setup request.

Multicast MAC address: a multicast MAC address for which an AP has to process a relevant IGMP.

The multicast MAC address is an address used for identifying a specific multicast service. A multicast service can be identified by an IP address which in turn can be mapped to a specific MAC address. That is, the multicast MAC address is a MAC address onto which a specific IP address is mapped, and corresponds to a MAC address for the multicast service.

Figure 9:
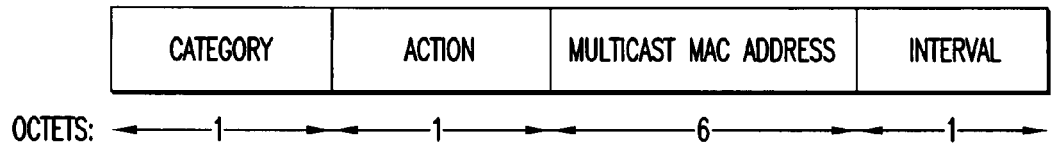
FIG. 9 is a view showing another example of a service activation request action frame according to an embodiment of the present invention.

FIG. 9 is a view showing another example of a service activation request action frame according to the present embodiment.

Respective parameters contained in the action frame of FIG. 9 are described below.

Category: a category value for a multicast IGMP action request action frame, which is set to '7' (multicast IGMP action).

Action: set to '0' for a multicast IGMP setup request.

Multicast MAC address: a multicast MAC address for which an AP has to process a relevant IGMP.

Interval: sets a minimum interval for responding to a keep-alive.

The action frame according to an example of FIG. 9 further contains the interval parameter.

A variety of actions can be performed by the interval parameter added according to the present embodiment. For example, information about a multicast service period determined by a multicast service can be obtained from an upper layer of a terminal. In this case, the multicast service period can be informed to an AP that communicates with the terminal through the interval parameter. For example, the multicast service period may be 20 msec. In this case, information about a period of 20 msec can be provided to the AP through the interval parameter. From the viewpoint of the terminal, if the multicast data are transmitted at a period of 20 msec and are actually transmitted for 5 msec, the terminal can enter a power saving (PS) mode for 15 msec or less. However, an operation of entering the power saving mode is preferably performed in connection with an operation of transmitting a keep-alive request that has been transmitted by the AP. That is, the AP transmits a keep-alive request to confirm the presence of the terminal. It is preferred that no terminal enter the power saving mode at the time when the AP transmits the keep-alive request. If the multicast data are transmitted for 5 msec and a keep-alive request is then transmitted shortly, the terminal can receive the data and the keep-alive request, transmit a response to the keep-alive request and then enter the power saving mode. In order to smoothly perform these operations, information about the multicast service period or on the minimum period enough to respond to the keep-alive request is preferably transmitted to the AP. In the present embodiment, therefore, it is proposed to provide specific interval information through the interval parameter.

Figure 10:
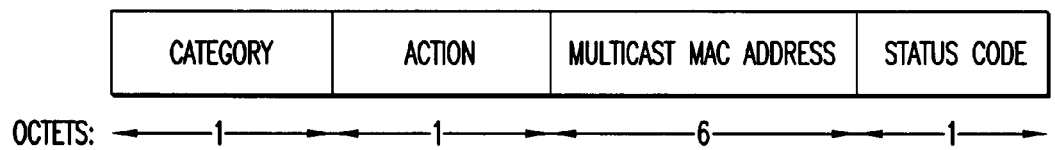
FIG. 10 is a view showing an example of a service activation response action frame proposed in an embodiment of the present invention.

FIG. 10 shows an example of a service activation response action frame proposed in the present embodiment. Parameters contained in the illustrated action frame are described below.

Category: a category value for a multicast IGMP action request action frame, which is set to '7' (multicast IGMP action).

Action: set to '1' for a multicast IGMP setup response.

Multicast MAC address: a multicast MAC address for which an AP has to process a relevant IGMP.

Status Code: indicates a response of the AP to a multicast IGMP setup request. Their details are shown in Table 5.

TABLE 5

| Status code field | |
|---|---|
| Status code | Meaning |
| 0 | Successful |
| 1 | Unspecified Failure |
| 2-255 | Reserved |

That is, the service activation response action frame can indicate whether a request of a terminal can be accepted.

Figure 11:
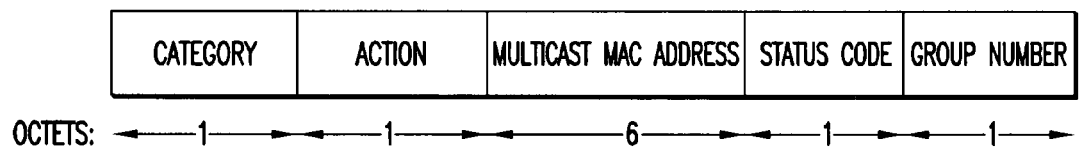
FIG. 11 is a view showing another example of a service activation response action frame proposed in an embodiment of the present invention.

FIG. 11 shows a further example of a service activation response action frame proposed in the present embodiment. Parameters contained in the illustrated action frame are described below.

Category: a category value for a multicast IGMP action request action frame, which is set to '7' (multicast IGMP action).

Action: set to '1' for a multicast IGMP setup response.

Multicast MAC address: a multicast MAC address for which an AP has to process a relevant IGMP.

Status Code: indicates a response of the AP to a multicast IGMP setup request. Their details are shown in above Table 5.

Group Number: a value assigned by the AP to every multicast address (i.e., multicast MAC address) for the management. The group number parameter enables one or more terminals to be identified using a single group number. That is, terminals that receive the service activation response action frame can be identified by a single specific group number. It is further advantageous to identify specific terminals as a single group than to individually assign an identification number to each of a plurality of terminals. Specific terminals can be efficiently grouped through an action frame according to an example of FIG. 11. In addition, terminals belonging to the same group can be identified by a single group number.

Hereinafter, an example of a table for processing IGMP in the AP is explained.

TABLE 6

Multicast Group Table entry format

| Field Name | Descriptions |
|---|---|
| STA's MAC address | MAC address of a mobile terminal that transmits a request |
| Multicast MAC Address | Multicast MAC address for IGMP processing |
| Group Number | Group number assigned to each multicast address |
| Expiration Time | Countdown time to delete from the table |

Table 6 can be managed by the AP. However, Table 6 is merely an example of the present embodiment, and the present invention is not limited to the contents shown in Table 6. That is, the group number field shown in the table is a data field necessary when each terminal is identified by a specific group number. Thus, the group number field can be added or deleted, if necessary. The expiration time field is a data field for deleting information on a specific terminal that does not respond normally within a predetermined period of time. The table can be prevented from being excessively extended through the expiration time field, and thus, it is preferred that the expiration time field be contained in the multicast group table.

Hereinafter, a method of transmitting, by the AP, a keep-alive request message for inquiring whether a mobile terminal exists in a network is explained. In the present embodiment, three schemes to transmit the keep-alive request message are proposed. A first scheme is to transmit the keep-alive request message through a separate action frame, a second scheme is to transmit the keep-alive request message in a state where it is contained in a beacon message, and a third scheme is to piggyback the keep-alive request message on multicast data.

In the first place, the first scheme is explained.

Figure 12:
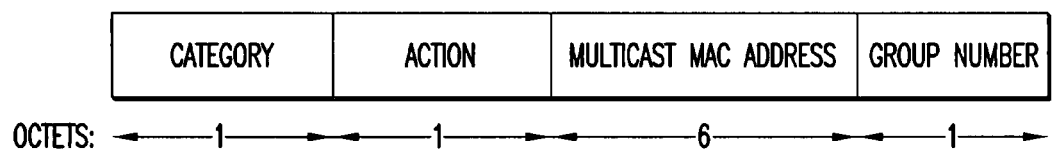
FIG. 12 is a view showing an example of a keep-alive request action frame for inquiring, by an AP, whether a mobile terminal exists in a network.

FIG. 12 shows an example of a keep-alive request action frame for inquiring, by an AP, whether a mobile terminal exists in a network. A mobile terminal that has received the keep-alive request action frame can transmit a keep-alive response action frame for informing the AP of its presence.

Parameters contained in the action frame of FIG. 12 are described below.

Category: a category value for a multicast IGMP action request action frame, which is set to '7' (multicast IGMP action).

Action: set to '2' for a keep-alive request.

Multicast MAC address: a multicast MAC address for which an AP has to process a relevant IGMP.

Group Number: indicates a group that should send a response to the keep-alive request. Group number '0' can be used to indicate that all the mobile terminals should respond. As described above, the group number may be used to identify one or more terminals as a single group and can be used in the action frames of FIGS. 11 and 12.

Now, the second scheme to transmit a keep-alive request message is explained.

An example of sending a keep-alive request message in a state where it is carried on a beacon is described below.

TABLE 7

| Order | Information | Notes |
|---|---|---|
| TBD | Keep-Alive Request Capability | Includes information for inquiring whether terminals exist in a network |

FIG. 13 shows an example of a keep-alive request capability information element. The information element (IE) is constructed as shown in FIG. 13 and allows a keep-alive request message to be carried on the beacon.

Parameters of the keep-alive request capability IE are described below.

Keep-alive request: set to '1' when a keep-alive request is transmitted through a beacon.

Group Number: indicates a group that should transmit a response to the keep-alive request. As described above, group number '0' can be used to indicate that all the mobile terminals should respond.

Next, the third scheme to transmit a keep-alive request message is described.

That is, a scheme to piggyback a keep-alive request on multicast data is described. The piggybacking scheme is again divided into two types.

One is to modify the type and subtype of the frame control field in the MAC frame format. That is, the fact that the keep-alive request message is contained in a portion of the frame body of a MAC frame can be informed using the type and subtype information. If the type and subtype information are assigned as shown in Table 8, a terminal can be aware that the keep-alive request message is contained in a portion of the frame body of the MAC frame.

TABLE 8

Valid type and subtype combinations

| Type value b3 b2 | Type description | Subtype value b7 b6 b5 b4 | Subtype description |
|---|---|---|---|
| 10 | Data | 101 | Multicast Data + Keep-Alive Request |

The keep-alive request message is preferably contained in a first portion of the frame body. That is, a group number field is added in the first portion of the frame body, by which the keep-alive request message can be transmitted.

Through a method different from the aforementioned method, a keep-alive request can be piggybacked on the multicast data. That is, a retry bit in the frame control field of a MAC frame can be set and notified to a terminal. Generally, since multicast data are not retransmitted, the retry bit is not meaningful when the multicast data are transmitted and received. In this embodiment, based on whether the retry bit has been set, it can be identified whether the keep-alive request message has been contained in a portion of the frame body of a MAC frame.

Hereinafter, a response message to a keep-alive request message, i.e. a keep-alive response message, is described. FIG. 14 shows an example of the keep-alive response message according to the present embodiment.

Parameters shown in FIG. 14 are described below.

Category: a category value for a multicast IGMP action request action frame, which is set to '7' (multicast IGMP action).

Action: set to '3' for a keep-alive response.

Multicast MAC address: a multicast MAC address for which an AP has to process a relevant IGMP.

Cause: contents transmitted to the AP from a terminal in response to a keep-alive request.

TABLE 9

| Cause Code | Meaning |
|---|---|
| 0 | Sustain Service |
| 1 | End Service |
| 2-255 | Reserved |

Hereinafter, a variety of methods of confirming, by an AP, whether the terminals recorded in the multicast group table of Table 6 actually exist in a network will be described using the aforementioned action frames and the like.

A first method:

An AP transmits a keep-alive request action frame to terminals in consideration of the expiration time field in the multicast group table. Each of terminals that receive the action frame informs the AP of its presence through a keep-alive response action frame. At this time, a terminal that has received the keep-alive request action frame transmits a keep-alive response action frame to the AP. Here, it is preferred that all terminals capable of communicating with the AP transmit the keep-alive response action frame to the AP and that only the keep-alive response action frames from the terminals specifically incapable of communicating with the AP are not transmitted.

A second method of transmitting a keep-alive request message through a beacon:

A keep-alive request message can be informed to terminals through a beacon that is periodically distributed to a network. At this time, each of terminals that receive the beacon transmits a keep-alive response action frame to an AP. As described above, a terminal that has received the keep-alive request action frame transmits the keep-alive response action frame to the AP. Here, in the same manner as the first method, it is preferred that all the terminals capable of communicating with the AP transmit the keep-alive response action frame to the AP and that only the keep-alive response action frames from the terminals specifically incapable of communicating with the AP are not transmitted.

A third method of controlling a multicast group table using an expiration time:

While transmitting a service activation request action frame, an expiration time can be set using an interval parameter. A value of the expiration time contained in the interval parameter may be the same as the value of the expiration time field of Table 6. The value of the expiration time contained in the interval parameter is set to a value for the purpose of saving power or the like in consideration of upper applications of a terminal. That is, during the set expiration time, the terminal can enter the power saving mode and may not respond to the keep-alive request. The AP selectively transmits the keep-alive request to terminals whose expiration time in the multicast group table of Table 6 has elapsed, in order to check whether the terminals are connected to the network.

A fourth method of controlling a multicast group table by transmitting a keep-alive request message when transmitting data at multicast data transmission intervals:

When data are transmitted at multicast data transmission intervals, a keep-alive request is piggybacked to confirm whether at least one or more terminals receive the multicast service.

In this case, the method of piggybacking a keep-alive request on multicast data may be divided into two schemes as described above.

The first scheme is to inform that a keep-alive request has been contained in multicast data by modifying the values of the type and subtype of the frame control field in a MAC frame when transmitting a data frame. The AP can periodically modify the type and subtype and write a group number into a starting portion of the frame body. In addition, a terminal that has received the data frame can be aware through the type and subtype that the piggyback has been made, confirm the group number and transmit a keep-alive response to the AP.

The second scheme is to set a retry bit of a frame control field in a MAC frame and inform a terminal that a keep-alive request has been contained. The retry bit is a bit informing that a currently transmitted frame is a retransmission frame. However, the retransmission is generally not allowed in a multicast service, and thus, the retry bit is not employed in the multicast service. In this embodiment, a communication method of informing terminals that a keep-alive request is contained in the MAC frame using the set retry bit.

A terminal can send various kinds of responses to the keep-alive request depending on the conditions of the terminal.

When a terminal intends to terminate a multicast service, it can be operated as follows.

If a terminal intends to terminate a multicast service, the terminal informs the AP of the termination of the multicast service such that the AP can delete an entry from a relevant table (e.g., Table 6). The fact that the multicast service is terminated can be informed by recording 'end service' into a cause field in a keep-alive response message.

When a terminal intends to continue receiving a multicast service, it can be operated as follows.

When a terminal intends to continue receiving the multicast service, it informs the AP of the continuation of the multicast service such that the AP can maintain the entry in the relevant table. The fact that the terminal intends to continue receiving the multicast service can be informed by recording 'sustain service' into the cause field in a keep-alive response message.

When a terminal is timed out while responding to a keep-alive request, it can be operated as follows. If a terminal does not respond to a keep-alive request due to an abnormal operation (e.g., power shutoff) and thus is timed out, the AP deletes information on the relevant terminal from the entries of a relevant table.

In the present invention, the following information elements are proposed such that wireless resources can be efficiently used when a mobile terminal moves to another network, i.e. to another AP.

FIG. 15 is a view showing a fast BSS transition information element additionally including an information element according to the present embodiment. Parameters contained in the information element of FIG. 15 are described below.

The information element of FIG. 15 is a modification of message that is provided in IEEE 802.11R. The information element of FIG. 15 further contains a multicast MAC address. Using the multicast MAC address, the previous AP that has received a message containing the information element can delete the STA's MAC address field of the terminal STA, which has transmitted the information, from the multicast group table of Table 6 by deleting a relevant entry regarding the multicast MAC address. In addition, a new AP to which the mobile terminal moves can register the STA's MAC address of the terminal into the multicast group table of Table 6 by inserting an entry regarding the multicast MAC address.

Parameters contained in the information element of FIG. 15 are described below.

Multicast MAC address: sends a multicast MAC address to register a relevant entry into the multicast group table of the new AP.

However, in the above method, the fast BSS transition is accomplished over the DS. In the case of over-the-air (OTA) where the terminal is directly connected to a target AP without using the previous AP, the previous and target APs cannot know which multicast service is currently used by the terminal. In this case, when the terminal transmits an association request for connection to the target AP, it is preferable to transmit the association request together with a multicast MAC address element to allow the target AP to know which multicast service is currently used by the terminal.

Accordingly, as shown in an example of an association request frame body of FIG. 16, it is preferred that the association request frame include multicast MAC address information containing information regarding the service currently used by the terminal.

Meanwhile, if the multicast MAC address is set in the association request, it is preferred that the target AP inform the previous AP of the setting using the inter-access point protocol (IAPP), ADD-notify packet, or MOVE-notify packet defined in IEEE 802.11F.

Figure 17A:
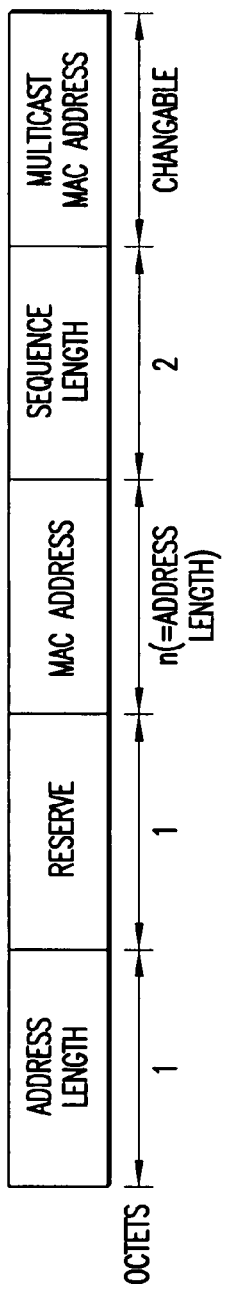
FIG. 17a is a view showing an example of an ADD-notify packet according to an embodiment of the present invention.
Figure 17B:
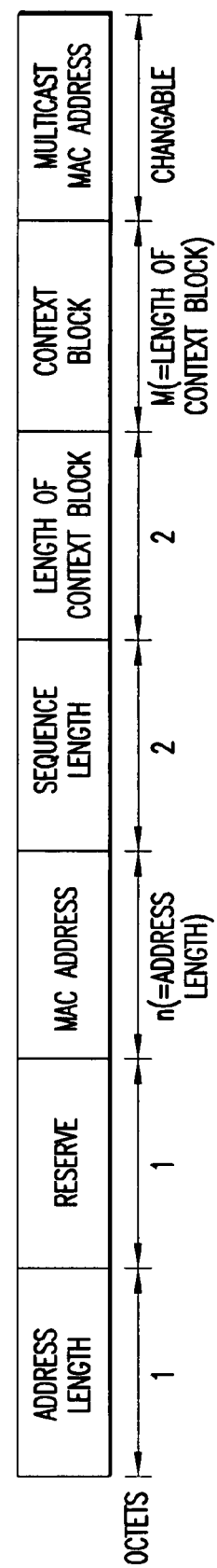
FIG. 17b is a view showing an example of an MOVE-notify packet according to an embodiment of the present invention.

As shown in FIG. 17*a*, therefore, when the ADD-notify packet is used, a multicast MAC address is included in ADD-notify data. In addition, as shown in FIG. 17*b*, when the MOVE-notify packet is used, a multicast MAC address is included in MOVE-notify data.

Hereinafter, a method of transmitting multicast data using the aforementioned action frames, information elements and the like will be described with reference to FIGS. 18 to 20.

A mobile terminal joins a service to receive a multicast service from a service provider. A process of joining a service is performed on an application of the mobile terminal. Therefore, the mobile terminal knows the start of the multicast service and prepares to receive the multicast service. Next, a procedure for creating an information transfer path from the service provider to the mobile terminal is performed. The procedures shown in FIGS. 18 to 20 are performed when the mobile terminal already knows the start of the multicast service by the operation of the application layer and the operations for transferring information by the service provider is actually executed.

Figure 18:
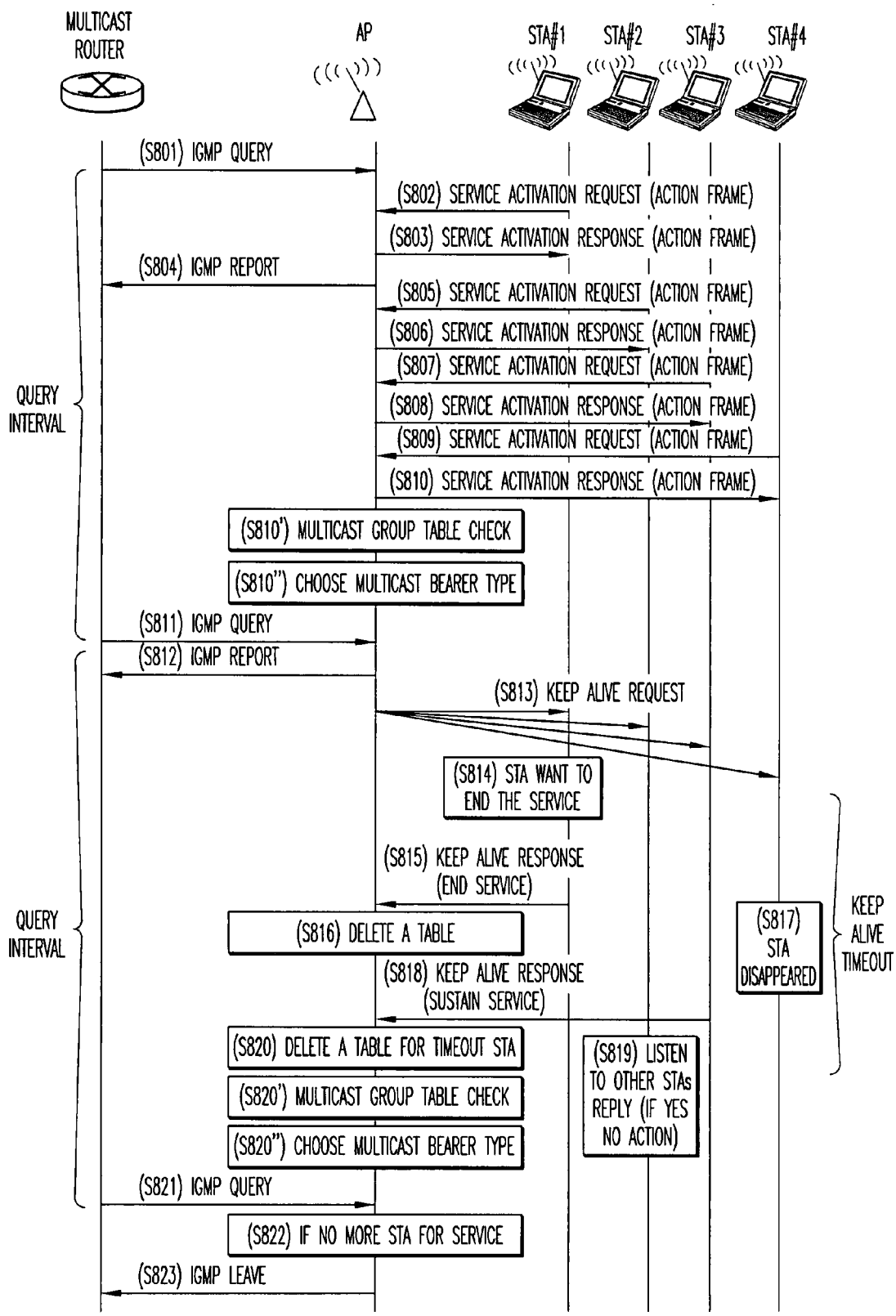
FIG. 18 is a flowchart illustrating a method of receiving multicast data by a mobile terminal according to an embodiment of the present invention.

FIG. 18 is a flowchart illustrating a method of receiving a multicast service by a mobile terminal according to an embodiment of the present invention.

First, the multicast router notifies information on the multicast service for the terminals to all the connected APs through an IGMP query (S801).

As described above, the mobile terminals can already know the start of the multicast service. If the mobile terminal wishes to receive the multicast service, it transmits a service activation request action frame proposed in this embodiment. At this time, a multicast MAC address for the relevant multicast service is carried on the service activation request action frame (S802).

An AP that has received the service activation request action frame transmits a service activation response action frame to the relevant mobile terminal when it can transmit an IGMP. Then, the AP records information on the relevant mobile terminal into the multicast group table. The multicast address and expiration time contained in the multicast group table are preferably set according to the service activation request action frame transmitted in step S802 (S803).

The AP allows the relevant mobile terminal to join the relevant multicast service by transmitting an IGMP report for the relevant multicast service to the multicast router. The multicast router that has received the IGMP report specifies in a multicast group membership list that the network (i.e., the AP) requests the relevant multicast service (S804).

Each of the other mobile terminals that wish to receive the multicast service can transmit a service activation request action frame, and the AP can respond to the service activation request action frame (S805 to S810).

Then, the AP examines the multicast group table (S810'). At this time, the AP checks the number of terminals, which wish to receive the multicast service, based on the multicast group table and determines whether a point-to-point or point-to-multipoint bearer is used for the multicast service (S810").

The multicast router transmits an IGMP query to all the APs every time interval to maintain the multicast group membership list (S811).

Accordingly, an AP receives the IGMP query and searches for the multicast group table. If a service request for the relevant multicast service exists in the multicast group table, the AP transmits an IGMP report to the multicast router. If no service request for the relevant multicast service exists in the multicast group table, the AP transmits an IGMP leave to the router (S812).

The AP periodically transmits a keep-alive request to every mobile terminal in order to maintain the multicast group table (S813). The keep-alive request can be transmitted according to any one of the aforementioned diverse methods.

The first terminal STA#1 that has received the keep-alive request determines to terminate the multicast service (S814).

The first terminal STA#1 sets the cause code of the keep-alive response of this embodiment to 'end service' and transfers the set keep-alive response to the AP (S815).

The AP deletes information on the first terminal STA#1 from the multicast group table (S816).

The third terminal STA#3 determines to continue receiving the multicast service, sets the cause code of the keep-alive response to 'sustain service' to transmit a response for continuously receiving the multicast service, and transfers the set keep-alive response to the AP (S818).

The second terminal STA#2 determines to continue receiving the multicast service. However, the second terminal receives the response message transmitted by the third terminal but does not transmit a response message to the AP (S819).

The fourth terminal abnormally disappears and cannot respond to the keep-alive request (S817).

The AP detects that the relevant mobile terminal has been timed out and then deletes a corresponding entry from the multicast group table (S820).

The multicast router retransmits an IGMP query after the query interval (S821).

If all the mobile terminals do not wish to receive the multicast service (S822), the AP transmits an IGMP leave to the multicast router and thus the relevant multicast service is terminated (S823).

The AP examines the multicast group table updated as above, every query interval (step 820').

At this time, the AP checks the number of terminals, which wish to receive the multicast service, based on the multicast group table and then determines whether a point-to-point or point-to-multipoint bearer is used for the multicast service (S820").

That is, the AP can perform a counting function of checking the number of terminals that wish to receive the multicast service within a specific cell, using the multicast group table collected as described above. The counting function is used to determine whether a wireless bearer that provides a specific MBMS service is set to a point-to-point or point-to-multipoint bearer. The AP internally sets a threshold (critical) value to select a wireless MBMS bearer. After performing the counting function, the AP can set the MBMS wireless bearer to a point-to-point bearer if the number of terminals in the cell is smaller than the threshold value or can set the MBMS wireless bearer to a point-to-multipoint bearer if the number of terminals in the cell is greater than or equal to the threshold value.

The AP checks the bearer through a keep-alive message. If the number of terminals is smaller than the threshold value, the AP changes the transmission mode from point-to-multipoint to point-to-point. In this case, the AP transmits a point-to-point multicast service to a relevant terminal and requests the terminal, which has received the multicast service, to request the relevant terminal to feedback information on channel load, AP channel report, neighbor report, received channel power indicator (RCPI), received signal to noise indicator (RSNI), and the like. The reason that the AP changes the transmission mode from point-to-multipoint to point-to-point is that channel information can be received to provide further improved services when the number of terminals using the multicast service is small. The reason that such feedback information is necessary is as follows.

The MBMS service in which multimedia is transmitted in broadcast or multicast mode can utilize the real-time transport protocol (RTP) by which packets are transmitted in real time. The RTP is a protocol designed suitably to transmit data with real-time characteristics such as audio or video data over a multicast or unicast network. While real-time data are transmitted in a downstream direction using the RTP, the RTP control protocol (RTCP) for controlling the downstream transmission of real-time data can be used in an upstream direction. The RTCP is transmitted through the point-to-point wireless bearer that is used in the upstream transmission of the MBMS, and the point-to-point wireless bearer used in transmitting upstream RTCP packets is different from the MBMS wireless bearer that is used in transmitting downstream RTP packets. Here, the main function of the RTCP is a feedback of state information on data distribution, which is used for the flow control and congestion control in the other protocols. More specifically, the RTCP packet indicates the amount of RTP packets that have been lost during transmission from a source to a final destination. This information is used to control the amount of RTP packets and to find out an appropriate encoding method.

As described above, when a point-to-multipoint wireless bearer is provided for a specific service in a specific cell, some of the terminals among the terminals that wish to receive the specific service are in an active connection state, whereas the other terminals are in an idle mode. At this time, if feedback information is necessary in the MBMS service, e.g. if the MBMS service is provided in the downstream direction using the RTP and the feedback information is received in the upstream direction using the RTCP, both the point-to-multipoint bearer and the point-to-point bearer can be received so that only active terminals among the terminals that have received the MBMS service can transmit the feedback information such as RTCP. That is, if both the point-to-multipoint bearer and the point-to-point bearer cannot be simultaneously received at any one of active connection modes, a terminal cannot transmit feedback information on the MBMS service.

In the MBMS service, a wireless network generally controls downstream MBMS data transmission using upstream feedback information received from a plurality of terminals. Since the downstream MBMS data transmission should consider the situations of all the terminals, it is preferable to receive feedback information from as many terminals as possible.

However, as described above, among the terminals that receive a specific MBMS service, only the terminals that are in an active connection mode and can simultaneously receive both a point-to-multipoint bearer and a point-to-point bearer can transmit upstream feedback information. Accordingly, considering limited wireless resources, it is preferable that the wireless network controls the terminals, which can simultaneously receive both a point-to-multipoint bearer and a point-to-point bearer among the terminals that wish to receive the specific MBMS service, in such a manner that they can be preferentially in an active state. Further, considering the fact that feedback information of terminals has an influence on MBMS data transmission, the wireless network controls premium users' terminals in such a manner that they can be preferentially in an active state to allow the feedback information transmitted from the premium users' terminals to be considered to the utmost.

At this time, the change of the downstream transmission mode from point-to-multipoint to point-to-point means that not a broadcasting channel but a dedicate channel is utilized in the downstream transmission. That is, a terminal can receive advertisement messages even during an idle time. Then, a point-to-point terminal can feedback its own channel state and a decoding state of currently received data, whereas a point-to-multipoint terminal only listens but does not feedback.

Accordingly, point-to-point terminals that provide feedback are needed from the viewpoint of the AP. A point-to-point terminal can feedback its own channel state. For reference, about 255 point-to-point channels can be now allocated to an AP in theory. That is, according to a predetermined critical value (at this time, the critical value is set according to the number of maximally allocatable point-to-point channels of an AP), the transmission mode is automatically changed from point-to-point to point-to-multipoint or from point-to-multipoint to point-to-point.

Figure 19:
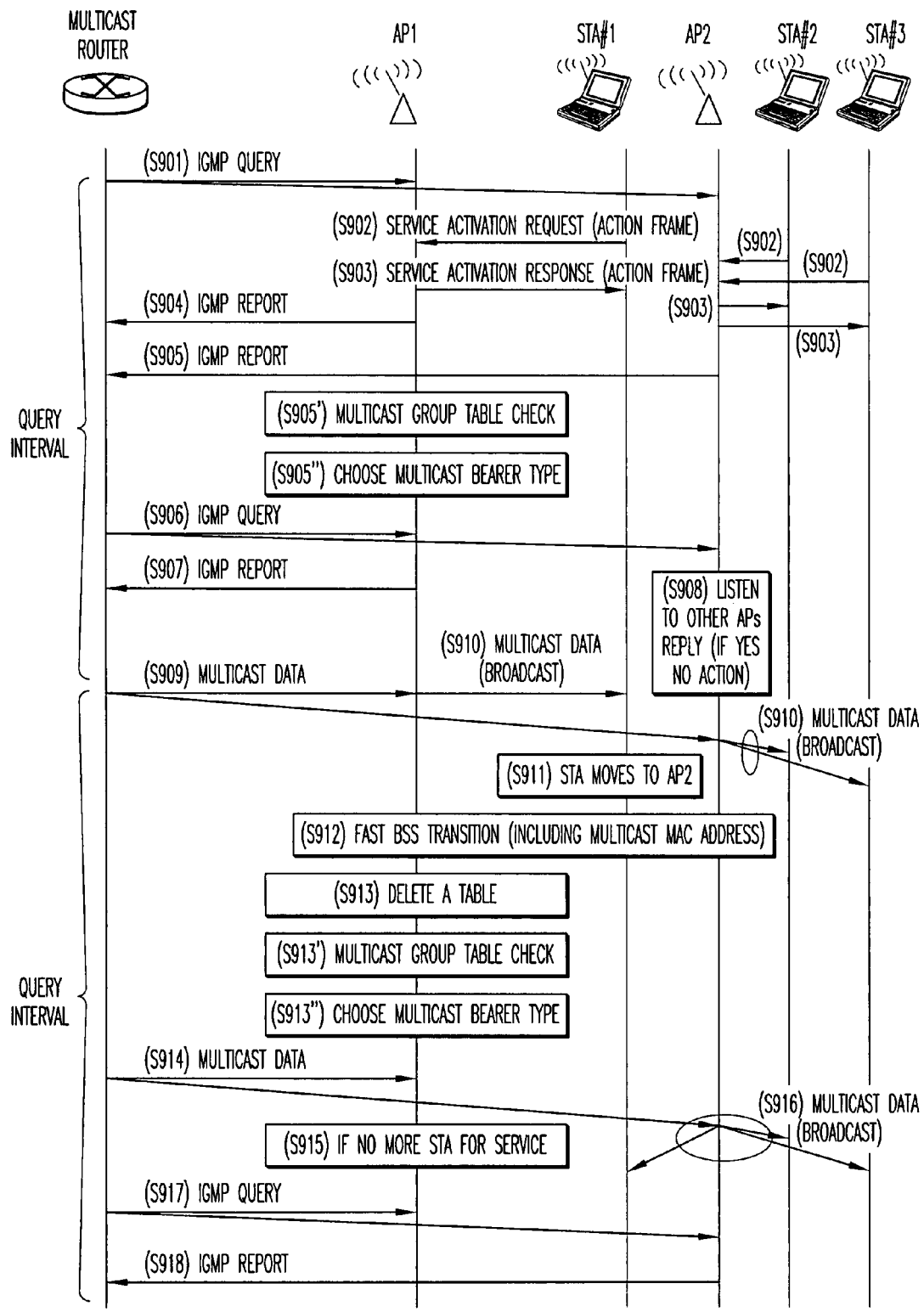
FIG. 19 is a flowchart illustrating a method of providing a multicast service when a specific mobile terminal moves into an area of another AP.

FIG. 19 is a flowchart illustrating a method of providing a multicast service when a specific mobile terminal moves into an area of another AP.

First, the multicast router informs all the connected APs AP1 and AP2 of information on the multicast service through an IGMP query (S901).

As described above, the mobile terminals can already know the start of the multicast service. If the mobile terminal wishes to receive the multicast service, it transmits a service activation request action frame proposed in the present embodiment. At this time, a multicast MAC address for the relevant multicast service is carried on the service activation request action frame (S902).

An AP that has received the service activation request action frame transmits a service activation response action frame to the relevant mobile terminal when it can transmit an IGMP instead (of the multicast router ??) (S903).

The AP AP1 allows the relevant terminal to join the relevant multicast service by transmitting an IGMP report for the multicast service to the multicast router (S904).

Further, the AP AP2 allows the relevant terminal to join the relevant multicast service by transmitting an IGMP report for the multicast service to the multicast router (S905).

At this time, the AP also examines the multicast group table (S905'). At this time, the AP checks the number of terminals, which wish to receive the multicast service, based on the multicast group table and then determines whether a point-to-point or point-to-multipoint bearer is used for the multicast service (S905").

An IGMP query is transmitted to all the APs in the same manner as step S901 (S906), and the AP AP1 transmits an IGMP report to the router (S907).

The AP AP2 may receive the IGMP report transmitted by the AP1 but not transmit an IGMP report to the router (S908).

The multicast router transmits multicast data to all the APs in the network (S909).

All the APs receive the multicast data and transmit the multicast data into the network (S910).

Until now, the first terminal has communicated with the AP AP1, and the second and third terminals have communicated with the AP AP2. However, the first terminal moves into an area of the AP AP2 and can communicate with the AP AP2 (S911).

The fast BSS transition information element of this embodiment contains information on a relevant multicast MAC address. Therefore, the relevant multicast MAC address is recorded in the information element, and a fast BSS transition is then performed. In this manner, information on the multicast service is stored in the multicast group table of the AP AP2 (S912).

Since the first terminal STA#1 does no longer exist in the AP AP1, information on the first terminal is deleted from the relevant entry of the multicast group table according to the fast BSS transition information element (S913).

Then, as described above, the AP examines the multicast group table updated as described above every query interval (S913').

At this time, the AP checks the number of terminals, which wish to receive the multicast service, based on the multicast group table and then determines whether a point-to-point or point-to-multipoint bearer is used as a bearer for the multicast service (S913").

The multicast router retransmits multicast data to all the APs in the network (S914).

Since there is no terminal for receiving the relevant multicast data, the AP AP1 does not transmit the received multicast data into the network (S915). Accordingly, wireless resources can be efficiently utilized.

The AP AP2 retransmits the received multicast data into the network such that terminals including the first terminal STA#1 can receive the multicast data (S916).

The multicast router retransmits an IGMP query after the query interval (S917).

The AP AP2 transmits an IGMP report in response to the IGMP query (S918).

Figure 20:
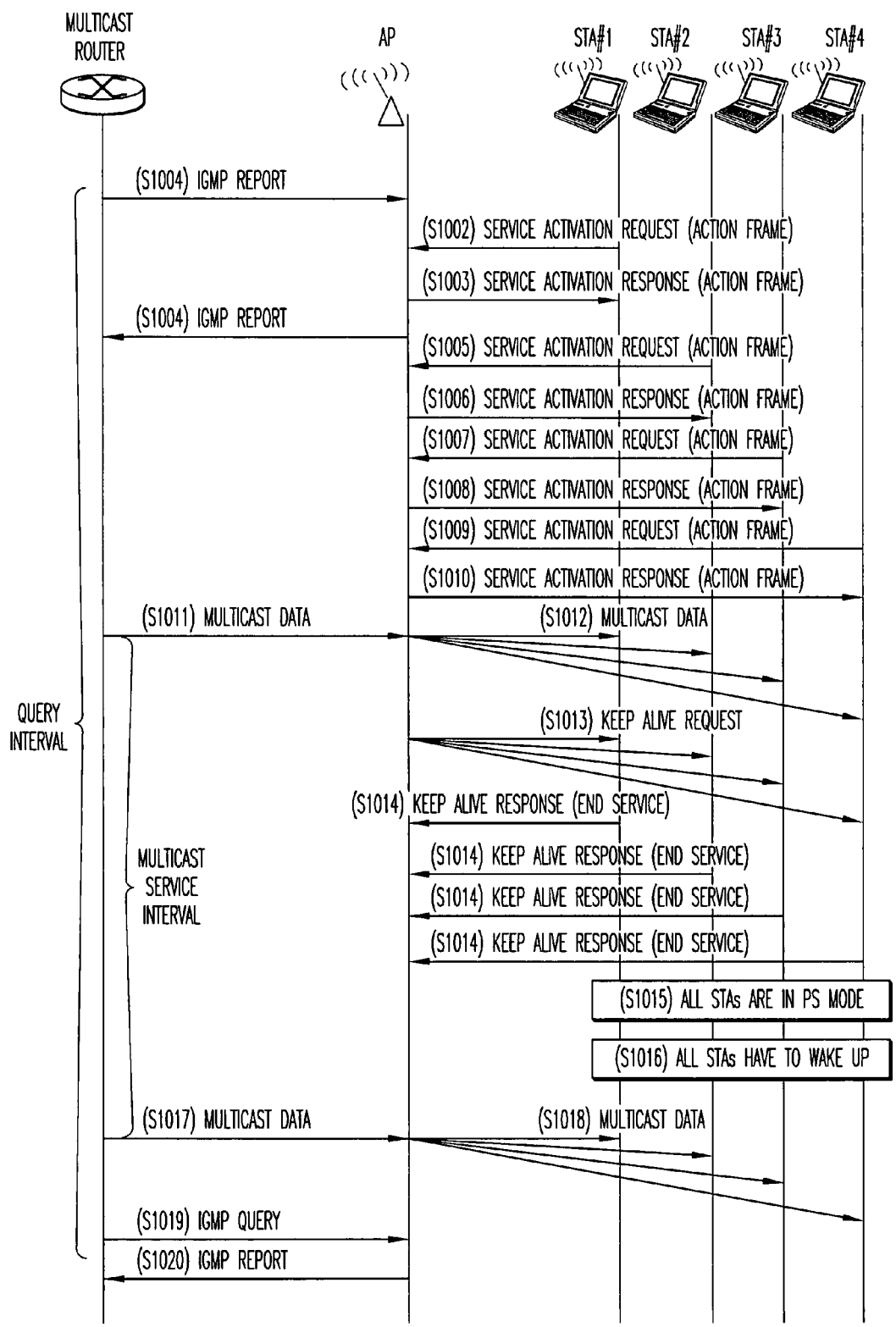
FIG. 20 is a flowchart illustrating another example of a method of receiving multicast data by a mobile terminal according to an embodiment of the present invention.

FIG. 20 is a flowchart illustrating another example of a method of receiving a multicast service of a mobile terminal according to the embodiment. In FIG. 20, the multicast service is provided at a regular interval. The regular interval, i.e. the multicast service interval, can be set by a service provider. Further, the regular interval may exist or not.

First, the multicast router informs all the connected APs of information on the multicast service for the terminals through an IGMP query (S1001).

As described above, the mobile terminals can already know the start of the multicast service. If the mobile terminal wishes to receive the multicast service, it transmits a service activation request action frame proposed in this embodiment. At this time, a multicast MAC address for the relevant multicast service is carried on the service activation request action frame (S1002).

An AP that has received the service activation request action frame transmits a service activation response action frame to the relevant mobile terminal when it can transmit an IGMP (S1003).

The AP allows the relevant mobile terminal to join the relevant multicast service by transmitting an IGMP report for the relevant multicast service to the multicast router (S1004).

Each of the other mobile terminals that wish to receive the multicast service can transmit a service activation request action frame to the AP, which in turn can respond to the service activation request action frame (S1005 to S1010).

The multicast router transmits multicast data to all the APs in the network (S1011).

All APs receive the multicast data and transmit the received multicast data into the network (S1012).

If there are no multicast data to be transmitted, the AP of the embodiment transmits a keep-alive request to the network (S1013). Since the keep-alive request can be transmitted in various ways as described above, step S1013 can be performed in various ways. If the keep-alive request is transmitted immediately after the multicast data have been transmitted, the terminal does not have to enter the PS mode. Since the terminal already knows that the keep-alive request is transmitted immediately after the multicast data have been transmitted, it does not enter the PS mode. Alternatively, the terminal can enter the PS mode after transmitting a response to the keep-alive request. In this manner, it is possible to prevent the terminal from failing to respond to the keep-alive request and to allow the terminal to stay in the PS mode further longer.

A mobile terminal that has received the keep-alive request determines to continue receiving the multicast service, sets a keep-alive response to 'end service', and transfers the set keep-alive response to the AP (S1014). At least any one of the four terminals shown in the figure can transmit the keep-alive response.

All the terminals can enter the PS mode within the multicast service interval (S1015).

At the end of the multicast service interval, all the terminals wake up to receive multicast data (S1016).

The multicast router transmits multicast data to all the APs in the network (S1017). All the APs receive the multicast data and transmit the received multicast data into the network (S1018). After the query interval has been lapsed, the multicast router transmits an IGMP query to the network (S1019). The AP receives the IGMP query and transmits an IGMP response to the multicast router to receive the multicast service (S1020).

According to the present invention, an AP transmits an IGMP report on behalf of each of mobile terminals through multicast group management, and unnecessary multicast data are prevented from being transmitted over a network. Therefore, wireless resources can be efficiently utilized.

Further, in the multicast group management according to the present invention, an AP checks the number of terminals, which wish to receive a specific MBMS service within a specific cell, and then determines whether a wireless bearer that provides the MBMS service is set to a point-to-multipoint or point-to-point bearer, using a collected multicast group table. Accordingly, a point-to-multipoint wireless bearer is used to provide the service to many terminals if there are many terminals that wish to receive the service, whereas a point-to-point wireless bearer is used to collect feedback information from the terminals and to provide high quality services if there are a few terminals that wish to receive the service.

Although the present invention has been described and illustrated in connection with the preferred embodiments, it will be readily understood by those skilled in the art that various modifications and changes can be made thereto without departing from the spirit and scope of the present invention defined by the appended claims. Accordingly, the present invention should be construed by the appended claims.

What is claimed is:

1. A method of transmitting and receiving multicast data in a network in which a multicast service is provided from a network entity and then transmitted to at least one mobile terminal, the method comprising the steps of:
   receiving a query message containing information on the multicast service from the network entity;
   receiving, from the mobile terminal, a request frame for requesting multicast data;
   in response to the request frame, transmitting to the network entity a report message allowing the mobile terminal to join the multicast service;
   receiving multicast data corresponding to the multicast service from the network entity and transmitting the received multicast data to the mobile terminal;
   determining, based on a group table provided on the network for managing the multicast service, the number of mobile terminals that have joined the multicast service;
   changing a multicast data transmitting and receiving mode of the multicast service according to the number of mobile terminals which have joined the multicast service;
   transmitting a keep-alive request to the mobile terminal for enabling the mobile terminal to enter a power savings mode;
   receiving a response to the keep-alive request before the mobile terminal enters the power saving mode,
   wherein the multicast data transmitting and receiving mode is one of a point-to-multipoint bearer mode and a point-to-point bearer mode,
   wherein the mobile terminal can simultaneously receive data via both the point-to-multipoint bearer mode and the point-to-point bearer mode, and
   wherein the mobile terminal is configured to be in an active state; and
   transmitting to the mobile terminal a request message for confirming whether the mobile terminal exists in the network,
   wherein the request message is transmitted through any one of a separate action frame, beacon, and piggybacked multicast data, and
   wherein the piggybacked multicast data is created by modifying a type and a subtype of a frame control field in a media access control (MAC) frame, or by setting a retry bit in the frame control field of the MAC frame.

2. The method as claimed in claim 1, wherein the step of changing a multicast data transmitting and receiving mode comprises the steps of:
   comparing the number of mobile terminals that have joined the multicast service with a threshold value;
   if it is determined that the number of mobile terminals is smaller than the threshold value, setting the multicast data transmitting and receiving mode to the point-to-point wireless bearer mode; and
   if it is determined that the number of mobile terminals is greater than or equal to the threshold value, setting the multicast data transmitting and receiving mode to the point-to-multipoint wireless bearer mode.

3. The method as claimed in claim 2, wherein the threshold value is determined in accordance with a maximum number of channels that can be allocated in a point-to-point manner for each mobile terminal in the network.

4. The method as claimed in claim 3,
   wherein the group table includes at least one or more of
      information on the mobile terminal that requests the multicast service,
      a multicast MAC address for identifying the multicast service requested by the mobile terminal,
      information on a group number corresponding to the mobile terminal, and
      information on an expiration time for allowing information on the mobile terminal to be deleted from the group table when the mobile terminal does not respond to the network, and
   wherein the keep-alive request message is selectively transmitted to the mobile terminal when the expiration time has elapsed.

5. The method as claimed in claim 3, wherein, if the multicast data transmitting and receiving mode is set to the point-to-point wireless bearer mode, the network receives feedback information from the mobile terminal.

6. The method as claimed in claim 5, wherein the feedback information includes at least one or more of channel load, AP channel report, neighbor report, received channel power indicator (RCPI), and received signal to noise indicator (RSNI).

7. The method as claimed in claim 5, wherein the feedback information is real-time transport control protocol (RTCP).

8. The method as claimed in claim 1, wherein the query message and the report message are repeatedly transmitted and received at a predetermined time interval, and information on the mobile terminal stored in the group table is updated every time interval.

9. The method as claimed in claim 8, wherein the multicast data transmitting and receiving mode is changed at the predetermined time interval.

10. A method of transmitting and receiving multicast data in a network in which a multicast service is provided from a network entity and then transmitted to at least one mobile terminal, the method comprising the steps of:
   transmitting, to the mobile terminal, a request message for confirming whether the mobile terminal exists in the network, the request message transmitted through one of a separate action frame, a beacon, and piggybacked multicast data;
   receiving, from the mobile terminal, a response message corresponding to the request message;
   updating a group table, provided in the network to manage the multicast service, according to contents of the response message; and
   changing a multicast data transmitting and receiving mode of the multicast service according to the updated group table,
   wherein the multicast data transmitting and receiving mode is one of a point-to-multipoint bearer mode and a point-to-point bearer mode,
   wherein the mobile terminal can simultaneously receive data via both the point-to-multipoint bearer mode and the point-to-point bearer mode,
   wherein the mobile terminal is configured to be in an active state,
   wherein the response message is any one of a service sustain message for maintaining a joined state to continue receiving the multicast service and a service end message for terminating the joined state to stop receiving the service, and wherein the response message contains category, action, multicast MAC address and cause parameters; and if the response message is the service sustain message or service end message, the cause parameter is set to a code corresponding to the service sustain message or service end message.

11. A method of transmitting and receiving multicast data in a network in which a multicast service is provided from a network entity and then transmitted to at least one mobile terminal, the method comprising the steps of:

receiving, from the mobile terminal, a transition message when the mobile terminal moves between networks; and updating a group table, provided in the network to manage a multicast data transmitting and receiving mode of the multicast service, according to contents of the transition message, wherein the multicast data transmitting and receiving mode is one of a point-to-multipoint bearer mode when the number of mobile terminals registered in the group table is greater than or equal to a threshold value and a point-to-point bearer mode when the number of mobile terminals registered in the group table is smaller than the threshold value, wherein the mobile terminal can simultaneously receive data via both the point-to-multipoint bearer mode and the point-to-point bearer mode, and wherein the mobile terminal is configured to be in an active state, wherein the transition message includes a multicast MAC address for identifying the multicast service provided to the moving mobile terminal.

12. A method of transmitting and receiving multicast data in a network in which a multicast service is provided from a network entity and then transmitted to at least one mobile terminal, the method comprising the steps of:

receiving from the mobile terminal an association request message transmitted to the network by the mobile terminal;

updating a group table, provided in the network to manage the multicast service, according to contents of the association request message;

checking the number of mobile terminals that have joined the multicast service based on the updated group table, wherein a multicast data transmitting and receiving mode of the multicast service is one of a point-to-multipoint bearer mode and a point-to-point bearer mode, wherein the mobile terminal can simultaneously receive data via both the point-to-multipoint bearer mode and the point-to-point bearer mode, wherein the mobile terminal is configured to be in an active state, wherein the association request message contains a multicast MAC (media access control) address element including information on a service currently used by the mobile terminal; and informing a previous network that the mobile terminal has joined a new network.

13. The method as claimed in claim 12, wherein the informing step is performed through a transfer mode using an ADD-notify packet or a MOVE-notify packet.

14. The method as claimed in claim 13, wherein the ADD-notify packet or the MOVE-notify packet contains a multicast MAC (media access control) address element.

15. A method of transmitting and receiving multicast data in a mobile terminal that receives, via a network, a multicast service from a network entity through an AP (access point), the method comprising the steps of:

transmitting, to the AP, a service activation request frame including a request to receive the multicast service, the service activation request frame containing information about a multicast service period or information about a minimum period for responding to a keep-alive request;

receiving a service activation response frame from the AP; and receiving data from the AP according to a multicast data transmitting and receiving mode of the multicast service set by the AP, wherein the multicast data transmitting and receiving mode of the multicast service is determined according to the number of mobile terminals registered in a group table of the AP, wherein the multicast data transmitting and receiving mode is one of a point-to-multipoint bearer mode and a point-to-point bearer mode, wherein the mobile terminal can simultaneously receive data via both the point-to-multipoint bearer mode and the point-to-point bearer mode, and wherein the mobile terminal is configured to be in an active state, wherein the multicast data transmitting and receiving mode is set either to the point-to-multipoint wireless bearer mode when the number of mobile terminals registered in the group table is greater than or equal to a threshold value or to the point-to-point wireless bearer mode when the number of mobile terminals registered in the group table is smaller than the threshold value.

16. The method as claimed in claim 15, wherein the service activation request frame contains a multicast MAC (media access control) address for identifying the multicast service requested by the mobile terminal and information on an expiration time for allowing information on the mobile terminal to be deleted from the group table when the mobile terminal does not respond to the network.

17. The method as claimed in claim 15, further comprising:

when the multicast data transmitting and receiving mode is set to the point-to-point wireless bearer mode, transmitting feedback information to the AP, the feedback information containing one of a channel load, an AP channel report, a neighboring report, a received channel power indicator (RCPI), and a received signal to noise indicator (RSNI).

18. The method as claimed in claim 15, further comprising the steps of:

receiving from the AP a request message for confirming whether the mobile terminal exists in the network; and transmitting a response message in response to the request message.

19. A method of transmitting and receiving multicast data in a mobile terminal that receives, via a network, a multicast service from a network entity through an AP (access point), the method comprising the steps of:

receiving from the AP a request message for confirming whether the mobile terminal exists in the network; and transmitting a response message for updating a group table provided in the network, in response to the request message, wherein the request message is transmitted through one of a separate action frame, a beacon, and piggybacked multicast data, wherein the piggybacked multicast data is formed by modifying a type and a subtype of a frame control field in a media access control (MAC) frame, or by setting a retry bit in the frame control field of the MAC frame, wherein the response message contains category, action, multicast MAC address and cause parameters, and wherein the mobile terminal assigns a service sustain code to the cause parameter when the response message is a service sustain message, and assigns a service end code to the cause parameter when the response message is a service end message, and then transmits the response message to the AP.

20. A method of transmitting and receiving multicast data in a mobile terminal that receives, via a network, a multicast service from a network entity through an AP (access point), the method comprising the steps of:

transmitting a transition message for updating a group table, provided in the network to manage the multicast service, when the mobile terminal moves between networks, wherein the transition message contains a multicast MAC (media access control) address for identifying a multicast service provided to the mobile terminal when the mobile terminal moves between networks;

receiving multicast data and a keep-alive request in response to the transition message;

transmitting a response to the keep-alive request; and entering a power saving mode after the response to the keep-alive request is transmitted, wherein the multicast data transmitting and receiving mode is one of a point-to-multipoint bearer mode when the number of mobile terminals registered in the group table is greater than or equal to a threshold value and a point-to-point bearer mode when the number of mobile terminals registered in the group table is smaller than the threshold value.

21. A method of transmitting and receiving multicast data in a mobile terminal that receives, via a network, a multicast service from a network entity through an AP (access point), the method comprising the steps of:

transmitting an association request message to receive the multicast service when the mobile terminal moves between networks, wherein a group table, provided in the network to manage the multicast service, is updated according to the association request message;

receiving multicast data and a keep-alive request in response to the association request message;

transmitting a response to the keep-alive request; and entering a power saving mode after the response to the keep-alive request is transmitted, wherein a multicast data transmitting and receiving mode of the multicast service is one of a point-to-multipoint bearer mode and a point-to-point bearer mode, wherein the mobile terminal can simultaneously receive data via both the point-to-multipoint bearer mode and the point-to-point bearer mode, wherein the association request message contains a multicast MAC (media access control) address element including information on a service currently used by the mobile terminal.

* * * * *